May 27, 1969
J. W. HAGER
3,446,435
EXPULSION DEVICE HAVING FLOATING PISTON
Filed June 19, 1967
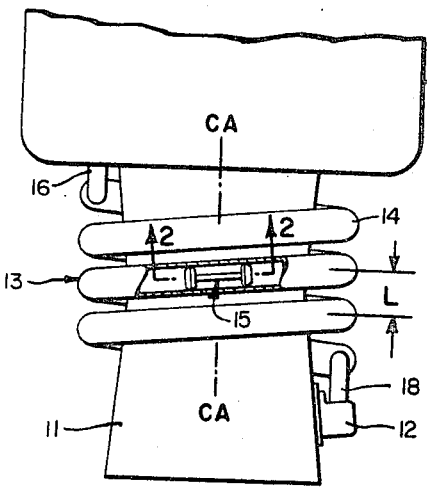
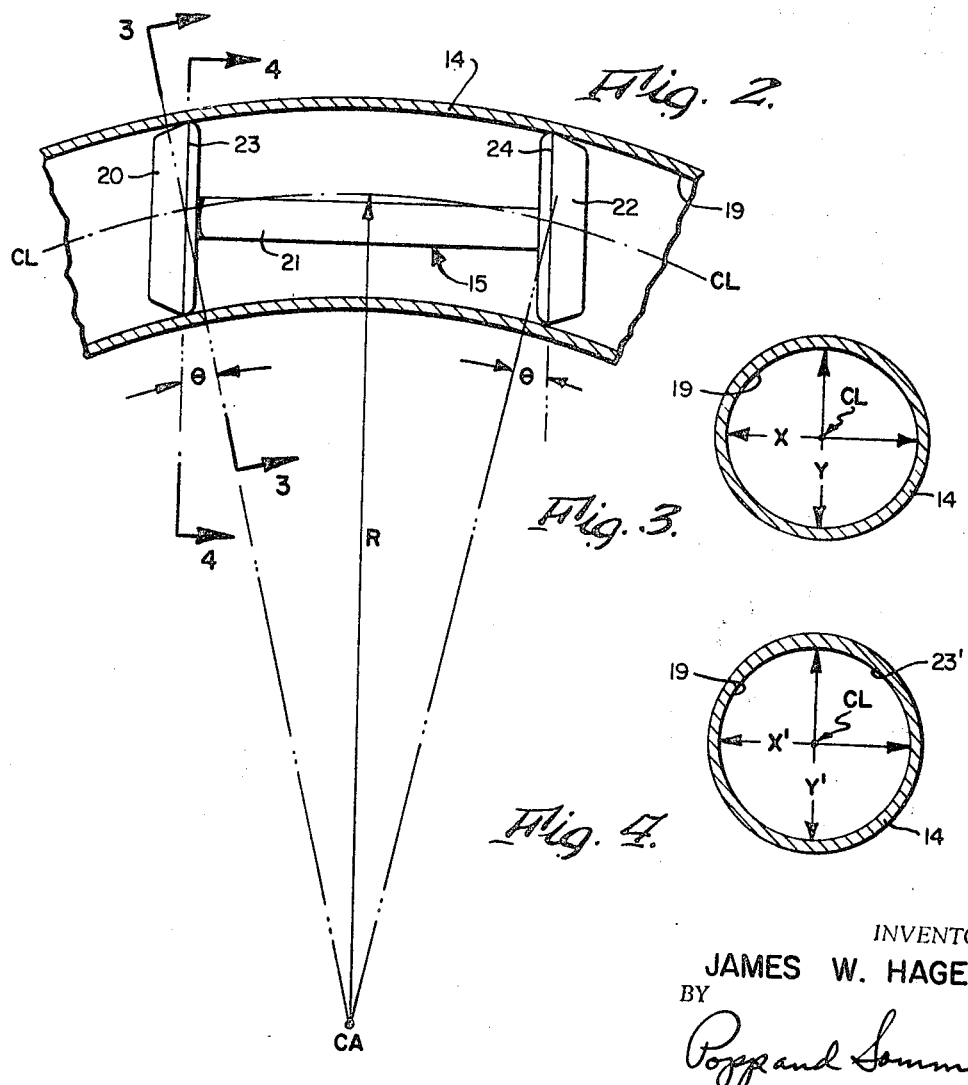
INVENTOR.
JAMES W. HAGER
BY
*Popp and Sommer*
ATTORNEYS United States Patent Office 3,446,435
Patented May 27, 1969

3,446,435
EXPULSION DEVICE HAVING FLOATING PISTON
James W. Hager, San Marino, Calif., assignor to Moog Inc., East Aurora, N.Y., a corporation of New York
Filed June 19, 1967, Ser. No. 647,164
Int. Cl. B64c 15/10; F02k 1/20
U.S. Cl. 239—265.23
6 Claims

ABSTRACT OF THE DISCLOSURE

An expulsion device in which a floating piston member is movable through a curved conduit, even one having a helical shape, the piston member being driven by a pressurized fluid applied to one end of the piston, and the fluid to be pressurized for expulsion being arranged on the other end of the piston member.

Background of the invention

There is frequent need for pressurized liquid in a space vehicle or space booster. This pressurized liquid may be used, for example, for liquid secondary injection steering control of a solid propellant rocket engine, or for fuel in monopropellant space vehicle attitude thrusters, or for both fuel and oxidizer in hypergolic bipropellant engines.

Often the liquid pressurization is derived from a source of pressurized gas which may be derived, for example, from a cold gas such as nitrogen stored at a high pressure, say 5,000 p.s.i., and released through a pressure reduction valve. The source of gas for pressurizing the liquid might also be developed by combustion of a solid propellant cartridge, or might also be derived as a bleed-off from the gas in the combustion chamber of the main vehicle engine.

Conventionally, the pressurizing gas has been heretofore separated from the liquid by a flexible bladder, such as a toroidal container split in the plane through the major circumference so as to fit in the annular space between an axially centered device such as an engine and the outer skirt of the vehicle. Sometimes such bladder-type gas to liquid separator takes the form of a spherical container split in a plane through a major circumference. In either case, these bladder-type gas to liquid separators have certain recognized disadvantages. One is the inherently difficult construction due to the split design. Another disadvantage is the lack of full expulsion of liquid due to the flexible nature of the bladder which separates the gas from the liquid.

Summary of the invention

The present invention provides an improved expulsion device, overcoming the aforementioned disadvantages of existing devices. The improved expulsion device according to the present invention comprises a tubular conduit curved at a constant radius throughout its length and having an internal wall surface which in radial cross section is elliptical in shape, and a floating piston member arranged in the conduit for movement longitudinally thereof and including leading and trailing head portions maintained a fixed distance apart and each in an appropriately oriented relation to the internal wall surface of the conduit such that each head portion has a circular peripheral line of contact with such wall surface. A pressurized drive fluid applied to one end of such piston member causes the fluid to be expulsed, confined within the conduit, on the other end of the piston member to be pressurized for expulsion as desired by valve means which form no part of the present invention. Since the floating piston member can move from one end of the curved conduit to the other end thereof, wasted space for drive fluid need not be provided in the device and a proportionately higher amount of injectant fluid can be carried in the conduit and which can be completely expulsed therefrom so that overall a smaller, lighter, more efficient and less expensive expulsion device can be provided by the present invention.

Brief description of the drawing

FIG. 1 is a fragmentary side elevational view of a rocket engine and showing the expulsion device of the present invention operatively associately with the engine to supply pressurized secondary injection fluid to the injector mounted on one side of the rocket nozzle for thrust vector control of the gaseous stream discharged from such nozzle, a portion of the helical conduit being broken away to reveal the floating piston member slidably arranged therein.

FIG. 2 is a fragmentary enlarged longitudinal central sectional view of the conduit of the expulsion device shown in FIG. 1 and showing the floating piston member of such device operatively arranged in such conduit, this view being taken on line 2—2 of FIG. 1 and revealing the relationship of the conduit and piston member to the center axis of curvature of this conduit.

FIG. 3 is a radial transverse sectional view of the conduit taken on line 3—3 of FIG. 2 and along a plane extending through and parallel to the center axis of curvature of the conduit, revealing the elliptical shape of the internal wall surface of the conduit.

FIG. 4 is another but non-radial transverse sectional view of the conduit taken on line 4—4 of FIG. 2 and along a plane extending parallel to said center axis, revealing the circular shape of the internal wall surface of the conduit at the place of contact with the periphery of a head portion of the piston member at one end thereof.

Description of the preferred embodiment

While the inventive expulsion device may be variously applied, the same is shown as operatively associated with a rocket engine. Accordingly, the numeral 10 represents a rocket engine such as one of the solid propellant type which burns to produce a pressurized gas discharged as a stream through a nozzle 11. On one side of this nozzle is shown an injector valve assembly 12 for controlling the flow of a suitable pressurized fluid. This fluid is injected as a jet stream in a direction transverse to the longitudinal axis, vertical as viewed in FIG. 1, of rocket nozzle 11 and hence transverse to the main stream of gas being discharged from this nozzle. The purpose is to deflect the thrust vector of such main stream and thereby provide directional control for whatever is being propelled by the rocket engine, such as a missile or space vehicle.

The purpose of the inventive expulsion device, represented generally in FIG. 1 by the numeral 13, is to supply pressurized secondary injectant fluid to injector 12. As shown, expulsion device 13 comprises a curved tubular conduit 14 and a floating piston member 15 arranged in this conduit for movement longitudinally thereof.

The driving force for piston member 15 may be a pressurized fluid derived from any suitable source. As shown, hot gas generated in the combustion chamber of the rocket engine is bled off and introduced into one end of conduit 14 by a connector 16. This drive gas fills the portion of conduit 14 between piston member 15 and the end of this conduit which is connected to connector 16.

The secondary injectant fluid to be pressurized by piston member 15 being driven against it as just described, occupies that portion of conduit 14 between this piston member and the end of this conduit which is communicatively connected by a connector 18 to injector 12. Piston member 15 is thus a movable barrier between the driving and driven fluids confined within conduit 14.

Conduit 14 is shown as helically wrapped around rocket nozzle 11 and concentrically therewith, the center axis of curvature being designated CA and the lead of the helix being designated L. While several convolutions of conduit 14 have been illustrated in FIG. 1, only a part of a single turn may be all that is desired depending on the radius of curvature about axis CA and the diameter of the tubing which is sused to provide conduit 14, in which case there will be no helical form to the conduit, rather a curved form with the centerline of the conduit lying in a plane extending transversely to axis CA.

Conduit 14 is shown as having a longitudinally extending centerline CL curved at a constant radius R about center axis CA, as shown in FIG. 1. The internal wall surface 19 of conduit 14 has an elliptical shape in any radial plane extending through and parallel to center axis CA, as shown in FIG. 3, wherein the major axis is designated X and the minor axis Y. This major axis X intersects centerline CL and extends generally longitudinally of center axis CA. If conduit 14 were non-helical in extent but rather of a longitudinal extent less than one complete revolution and with its centerline CL in a plane at right angles to center axis CA, then its major axis X would be parallel to center axis CA.

It is essential that the aforementioned elliptical shape of the conduit's internal wall surface 19 remains constant throughout the effective length of the conduit. Typically, conduit 14 is made from a length of cylindrical metal tubing of uniform wall thickness bent about center axis CA into circular or helical form, in either case with a constant radius R of curvature. In so bending the tubing, it will naturally assume the elliptical form in radial cross-section and maintain this shape as a result of its rigid wall structure. Obviously, the length of major axis X will be determine dby the inside diameter of the tubing selected. The length of minor axis Y depends upon such factors as the material of which conduit 14 is composed, the wall thickness thereof, the radius of curvature R, besides, of course, the inside diameter of the cylindrical tubing used to be formed into the curved conduit.

Floating piston member 15 may be variously constructed but as shown it comprises a leading enlarged head portion 20 rigidly connected by a reduced rod portion 21 to a trailing enlarged head portion 22. Head portion 20 is shown formed to provide a circular peripheral ridge 23. Head portion 22 has a similar circular peripheral ridge 24. Both ridges 23 and 24 have a circular peripheral line of contact with internal wall surface 19 of curved conduit 14. This circular line contact is depicted at 23' in FIG. 4 wherein the horizontal line X' and the vertical line Y', corresponding respectively to axes X and Y in FIG. 3, are equal in length to each other and to the length of major axis X. In other words, X' and Y' each represents the diameter of circle 23' which corresponds to the diameter of ridge 23. Ridge 24 has the same diameter as ridge 23.

In order that the piston member 15 can readily slide through conduit 14 some slight clearance will be provided in reality between ridges 23 and 24 and conduit internal wall surface 19. In fact, the head portions 20 and 22 of this piston member may be provided with annular elastomeric seal devices (not shown) to provide ridges 23 and 24 or the equivalent thereof.

It will be noted that the plane of each ridge 23 or 24 as at a predetermined angle to that radial plane which intersects centerline CL at the same place where the corresponding ridge plane intersects this centerline. For example, considering line 4—4 in FIG. 2 as representing the ridge plane for ridge 23, such plane is at that predetermined angle θ to the radial plane represented by line 3—3 in the same figure such that the contour of the conduit's internal wall surface 19 in such ridge plane is circular and the contour of this surface in such radial plane is elliptical. This same angle θ obtains between the radial and ridge planes for circular ridge 24, as also depicted in FIG. 2.

Thus is will be seen that the ridge planes for ridges 23 and 24 are parallel to each other and that the radially outer portions of these ridge planes are on opposite sides of the corresponding radial planes, as are also the radially inner portions of these ridge planes. This is but another way of stating that a circular plane exists on opposite sides of a given radial plane, all such planes intersecting at a common point. In the case of ridge 23, it is on one side of its radial plane; and in the case of ridge 24, it is on the other side of its radial plane.

It will also be noted that rod portion 21 of piston member 15 maintains head portions 20 and 22 with their respective ridges 23 and 24 in the appropriately oriented relation to the internal wall surface of curved conduit 14, regardless of where this piston member is located in and along the length of this conduit. Accordingly, piston member 15 is free, insofar as its physical shape is concerned, to move longitudinally of curved conduit 14. Another way of looking at it is that leading cicrular head portion 20 is retained in the appropriate angular relation θ to the internal wall surface of curved conduit 14 by rod portion 21 and trailing circular head portion 22. The reverse is also true, that is, trailing head portion 22 is maintained in the appropriate angular orientation θ to the wall of conduit 14 by rod portion 21 and leading head portion 20. From this, it will be seen that the various portions 20–22 of piston member 15 must be fixed or rigid one to another.

As previously indicated, a quantity of secondary injectant can be stored in curved conduit 14 with the floating piston member 15 therein backed up away from injector 12 the desired distance to provide the available quantity of such injectant desired. In this connection, if hot gas from the combustion chamber of the rocket engine is used as the drive fluid to pressurize the injectant and move the floating piston member, this member may be backed up initially all the way to the end of the curved conduit which is remote from injector 12 since no quantity of pressurizing fluid need be stored. This also maximizes the volume of injectant that can be stored.

Regardless of the source of the pressurizing fluid applied against the trailing end of the floating piston member 15, it will be seen that the injectant ahead of the leading end of this piston member will be pressurized and expelled from the container in response to opening injector 12.

From the foregoing, it will be seen that the present invention provides a smaller, lighter, more efficient and less expensive expulsion device for secondary injection purposes where these factors are important considerations. However, the inventive expulsion device may have other useful applications and specific constructions different from the preferred embodiment depicted and described herein. Accordingly, this preferred embodiment is illustrative and not limitative of the present invention which is to be measured by the scope of the appended claims.

I claim:

1. An expulsion device comprising a tubular conduit having a longitudinally extending centerline curved at a constant radius about a center axis, the internal wall surface of said conduit having an elliptical shape in any radial plane extending through and parallel to said center axis, the major axis of said elliptical shape intersecting said centerline and extending generally longitudinally of said center axis, said elliptical shape remaining constant throughout the effective length of said conduit, and a floating piston member arranged in said conduit for movement longitudinally thereof and including first and second head portions spaced from each other along said centerline, each of said head portions having a circular peripheral line of contact with said wall surface.

2. An expulsion device according to claim 1 wherein the wall of said conduit is rigid.

3. An expulsion device according to claim 2 wherein said piston member is rigid.

4. An expulsion device according to claim 3 wherein the circular peripheral lines of contact of said head portions are substantially parallel to each other.

5. An expulsion device according to claim 4 wherein said head portions are maintained a fixed distance apart.

6. An expulsion device for secondary injection fluid supplied to an injector and used for thrust vector control of a gas stream discharged from the nozzle of a rocket engine, comprising a tubular conduit helically wrapped around said nozzle and having a longitudinally extending centerline curved at a constant radius about a center axis axis and with a constant lead axially of said center axis, one end of said conduit being communicatively connected to a source of pressurized fluid such as gas generated by said engine and the other end of said conduit being communicatively connected to said injector, the internal wall surface of said conduit having an elliptical shape in any radial plane extending through and parallel to said center axis, the major axis of said elliptical shape intersecting said centerline and extending generally longitudinally of said center axis, said elliptical shape remaining constant throughout the effective length of said conduit, and a floating piston member arranged in said conduit for movement longitudinally thereof and including first and second head portions spaced from each other along said centerline, each of said head portions having a circular peripheral line of contact with said wall surface, said piston member providing a movable barrier between said pressurizing fluid and said injection fluid.

References Cited

UNITED STATES PATENTS

| 2,279,257 | 4/1942 | Svirsky | 138—93 |
| 2,399,544 | 4/1946 | Danner | 138—93 |
| 3,371,491 | 3/1968 | Pinter | 239—265.23 |
| 3,378,204 | 4/1968 | Chase et al. | 239—127.3 |

LAVERNE D. GEIGER, *Primary Examiner.*

IRA C. WADDEY, JR., *Assistant Examiner.*

U.S. Cl. X.R.

60—39.48, 231; 138—93; 222—389; 230—54